United States Patent [19]

Nagano

[11] Patent Number: 4,731,661

[45] Date of Patent: Mar. 15, 1988

[54] COLOR DOCUMENT READER WITH WHITE BALANCE ADJUSTER FOR DETERMINING LIGHT EMISSION PERIODS FOR A PLURALITY OF DIFFERENT-COLORED LIGHT SOURCES AND CORRESPONDING INTEGRATION TIMES FOR A LIGHT SENSOR BY READING A WHITE REFERENCE AREA

[75] Inventor: Fumikazu Nagano, Yamatokoriyama, Japan

[73] Assignee: Sharp Kabushiki Kaisha, Osaka, Japan

[21] Appl. No.: 797,892

[22] Filed: Nov. 14, 1985

[30] Foreign Application Priority Data

Nov. 16, 1984 [JP] Japan .............................. 59-242745
Dec. 11, 1984 [JP] Japan .............................. 59-261220

[51] Int. Cl.$^4$ .................... H04N 1/46; H04N 9/73; G03F 3/08
[52] U.S. Cl. .................................. 358/75; 358/29
[58] Field of Search ............................ 358/29 C, 75

[56] References Cited

U.S. PATENT DOCUMENTS

| | | | |
|---|---|---|---|
| 4,479,143 | 10/1984 | Watanabe et al. | 358/44 |
| 4,500,914 | 2/1985 | Watanabe et al. | 358/44 |
| 4,633,301 | 12/1986 | Saitoh | 358/75 |
| 4,642,679 | 2/1987 | Nagano | 358/75 |
| 4,654,723 | 3/1987 | Nagano | 358/293 |
| 4,658,289 | 4/1987 | Nagano et al. | 358/75 |
| 4,658,303 | 4/1987 | Nagano | 358/75 |
| 4,670,779 | 6/1987 | Nagano | 358/75 |

FOREIGN PATENT DOCUMENTS

| | | | |
|---|---|---|---|
| 0158332 | 10/1985 | European Pat. Off. | 358/75 |
| 0158962 | 10/1985 | European Pat. Off. | 358/75 |
| 30214 | 3/1980 | Japan | 358/75 |
| 154878 | 12/1980 | Japan | 358/75 |
| 58370 | 5/1981 | Japan | 358/75 |
| 211871 | 12/1982 | Japan | 358/75 |
| 39184 | 3/1983 | Japan | 358/75 |
| 57566 | 4/1984 | Japan | 358/75 |
| 188650 | 10/1984 | Japan | 358/75 |
| 87564 | 5/1985 | Japan | 358/80 |
| 130257 | 7/1985 | Japan | 358/75 |

*Primary Examiner*—James J. Groody
*Assistant Examiner*—Randall S. Svihla
*Attorney, Agent, or Firm*—Birch, Stewart, Kolasch & Birch

[57] ABSTRACT

A color document reader comprises a plurality of different-colored light sources which sequentially illuminate a color document, and a light sensor which receives light reflected from the document. Prior to reading the document, a white balance operation is performed by sequentially illuminating a white reference area with the different-colored light sources and directing light reflected from the document to the light sensor. The peak value of an output signal produced by the light sensor is monitored, and light emission periods for each of the different-colored light sources and corresponding integration periods for the light sensor are determined so that the peak value of the output signal is substantially equal to a predetermined reference value when the white reference area is illuminated by each of the different-colored light sources. The light emission periods are longer than the integration periods to allow the light output of the light sources to stabilize before the integration periods begin. The determined light emission periods and integration periods are stored in a memory, and the light sources and the light sensor are controlled in accordance with the stored light emission periods and integration periods while the color reader reads the color document.

2 Claims, 16 Drawing Figures

COLOR DOCUMENT READER WITH WHITE BALANCE ADJUSTER FOR DETERMINING LIGHT EMISSION PERIODS FOR A PLURALITY OF DIFFERENT-COLORED LIGHT SOURCES AND CORRESPONDING INTEGRATION TIMES FOR A LIGHT SENSOR BY READING A WHITE REFERENCE AREA

BACKGROUND OF THE INVENTION

The present invention relates to a color reader, which is used in such as a color scanner or the like.

Conventionally, for a color reading operation, there are proposed (1) a method of using a white color light source, filters of three primary colors of red, green, blue and three sensors corresponding to each of them, and (2) a method of disposing red, green, blue filters in such an order as red filter, green filter, blue filter, red filter, green filter, blue filter, red filter, ... on each of a plurality of adherence type sensors, but only a large-sized drum type of a color scanner by the method of the (1) is put into practical use at the present point.

SUMMARY OF THE INVENTION

Accordingly, an essential object of the present invention is to provide a color reader which is adapted to carry out a white balance method in the above-described color reading method.

Another object of the present invention is to provide a color reader which is adapted to carry out a method of preventing reading precision deterioration, which is caused due to the output changes after the lighting of the fluorescent lamp.

Still another object of the present invention is to provide a color reader which is adapted to carry out a method of adjusting the color by emphasizing or inhibiting the red, green, blue colors.

According to the present invention, in an apparatus which emits the light of the fluorescent lamps of three primary colors of red, green, blue sequentially and receives the reflected light from the manuscript by a single CCD sensor to perform the color reading operation, a means is provided which varies the light emission period of each respective red, green and blue fluorescent lamp, and the integration period of the light energy of the CCD sensor in accordance with the output level of the CCD sensor which receives the reflected light of each respective color against a white reference area, so that the output levels of the CCD sensors corresponding to the emitted light energies of the red, green, blue fluorescent lights are rendered almost the same.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
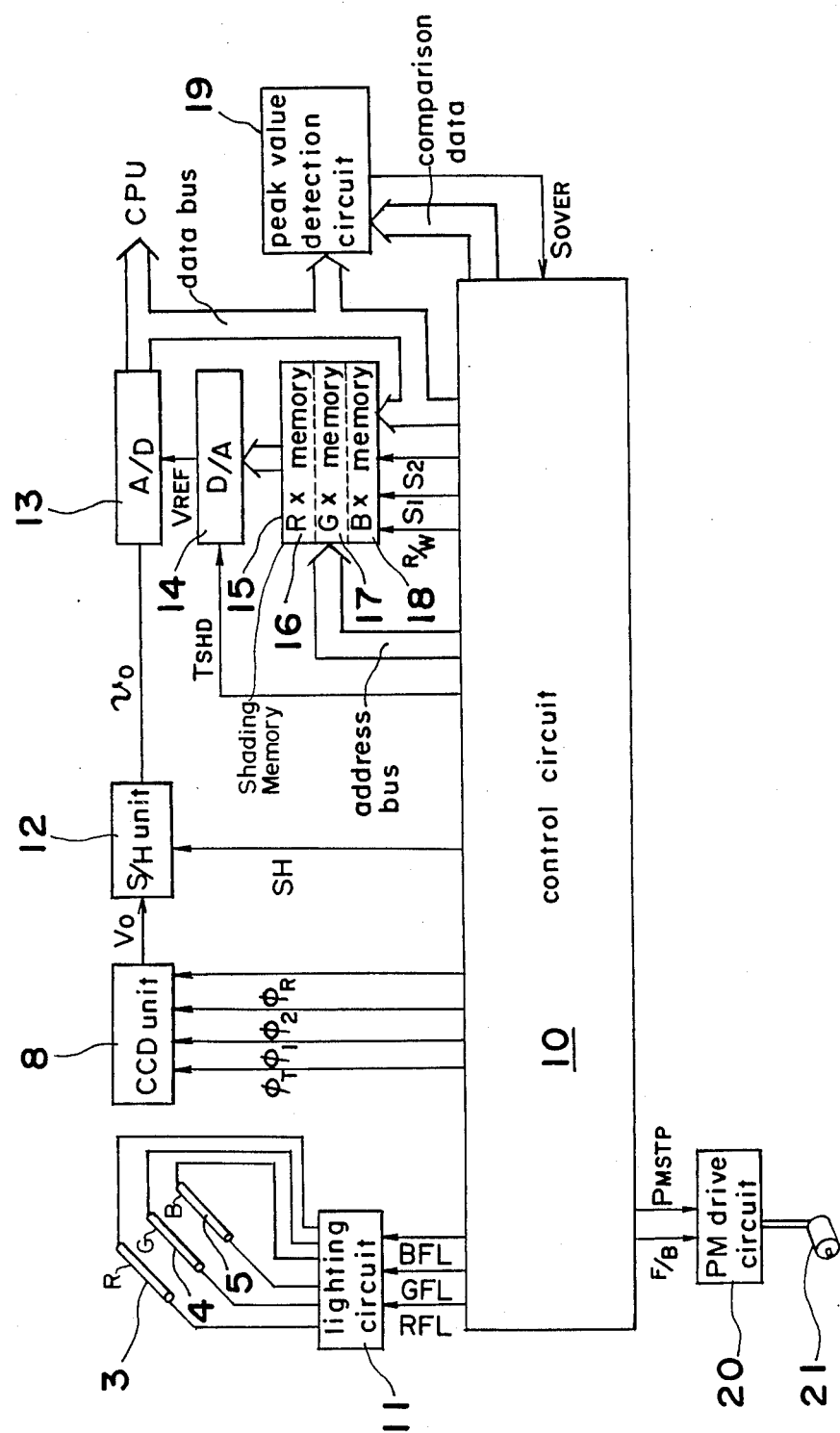
FIG. 1 is a block diagram showing the construction of the embodiment of the present invention.

Before the description of the present invention proceeds, it is to be noted that like parts are designated by like reference numerals throughout the accompanying drawings.

Figure 4:
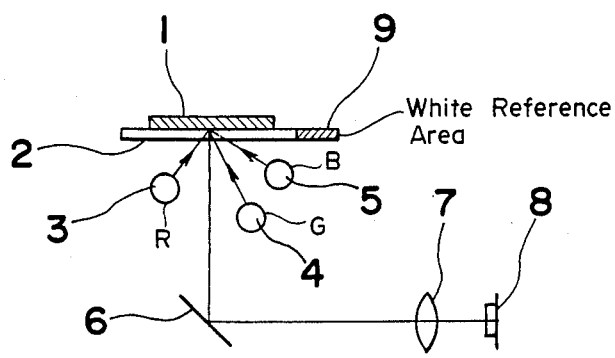
FIG. 4 is a view showing the approximate construction of an optical system of a color reader of the embodiment of the present invention.

Referring now to the drawings, there is shown in FIG. 4 the approximate construction of an optical system of a color reader. The respective emitted light beams of three fluorescent lamps 3, 4, 5 of red, green, and blue are sequentially transmitted through a glass substrate 2 onto a color manuscript 1. The reflected beams are incident onto the CCD sensor 8 through a mirror 6, and a lens 7.

A white reference area or reference white-color unit 9 sends to the CCD sensor 8 reflected light from the reference white-color unit 9 of the emitted lights of the red, green, blue fluorescent lights 3, 4, 5 before the reading of the color manuscript 1 is performed so as to perform the white balance method to be described later. The reference white-color unit 9 is selected from material of high quality so that the visible light is reflected (approximately 100%) better in the visible light region to render the reflection rate of the visible light region uniform. It is to be noted that the reference white-color unit 9 may be driven by a pulse motor (not shown) and moved to the reading position.

Figure 5:
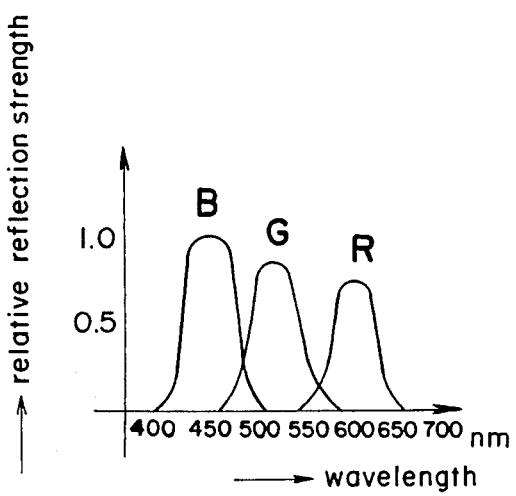
FIG. 5 is a graph showing the relative reflection strength characteristics of three colors.
Figure 6:
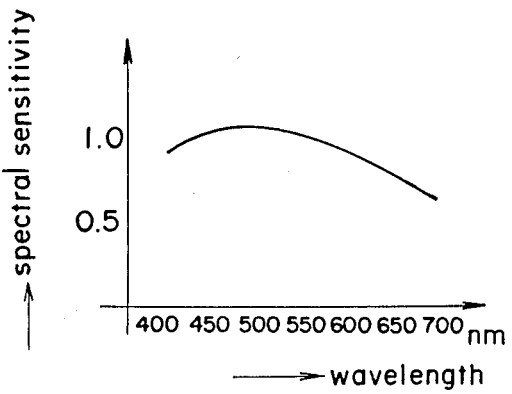
FIG. 6 is a graph showing the spectral sensitivity characteristics of a CCD sensor.

FIG. 5 shows one example of the relative strength with respect to the wave lengths of light which has been detected by the CCD sensor 8 through reflection from the reference white-color unit 9 of the respective light of the red, green, blue fluorescent lamps 3, 4, 5 emitted under the same conditions, R, G, B showing the respective reflection strengths of red light, green light, and blue light. FIG. 6 shows the spectral sensitivity characteristics of the CCD sensor in the same wavelength zone as that of FIG. 5. As apparent from FIG. 5 and FIG. 6, the output of the CCD sensor with respect to the emitted lights of the blue fluorescent lamp is largest, and the output of the CCD sensor with respect to the emitted lights of the red fluorescent lamp is smallest when the red, green, blue fluorescent lamps have been sequentially flashed under the same conditions. Namely, the outputs of the CCD do not become the same respectively under the same light emitting conditions.

The AD conversion accuracy of the output data of the CCD sensor in each color phase is varied upon variations of the emitted light strength of each fluorescent lamp of the red, green, and blue colors, of the sensitivity in each wavelength region of the red, green, blue of the CCD sensor or of the light application angle of each red, green, blue fluorescent lamp to the reading line, thus lowering the color reading accuracy.

To cope with this problem, according to the present invention, a white balance method is carried out. In addition, the present invention prevents reading accuracy deterioration, which is caused by the output changes after the lighting of the fluorescent lamps, and is adapted to easily adjust the color phase by color-phase emphasis or control.

FIG. 1 shows the construction of the color reader. A lighting circuit lights respectively the red, green, blue fluorescent lamps 3, 4, 5 while each signal is "1" in accordance with the lighting signals RFL, GFL, BFL from the control circuit 10.

Figure 2:
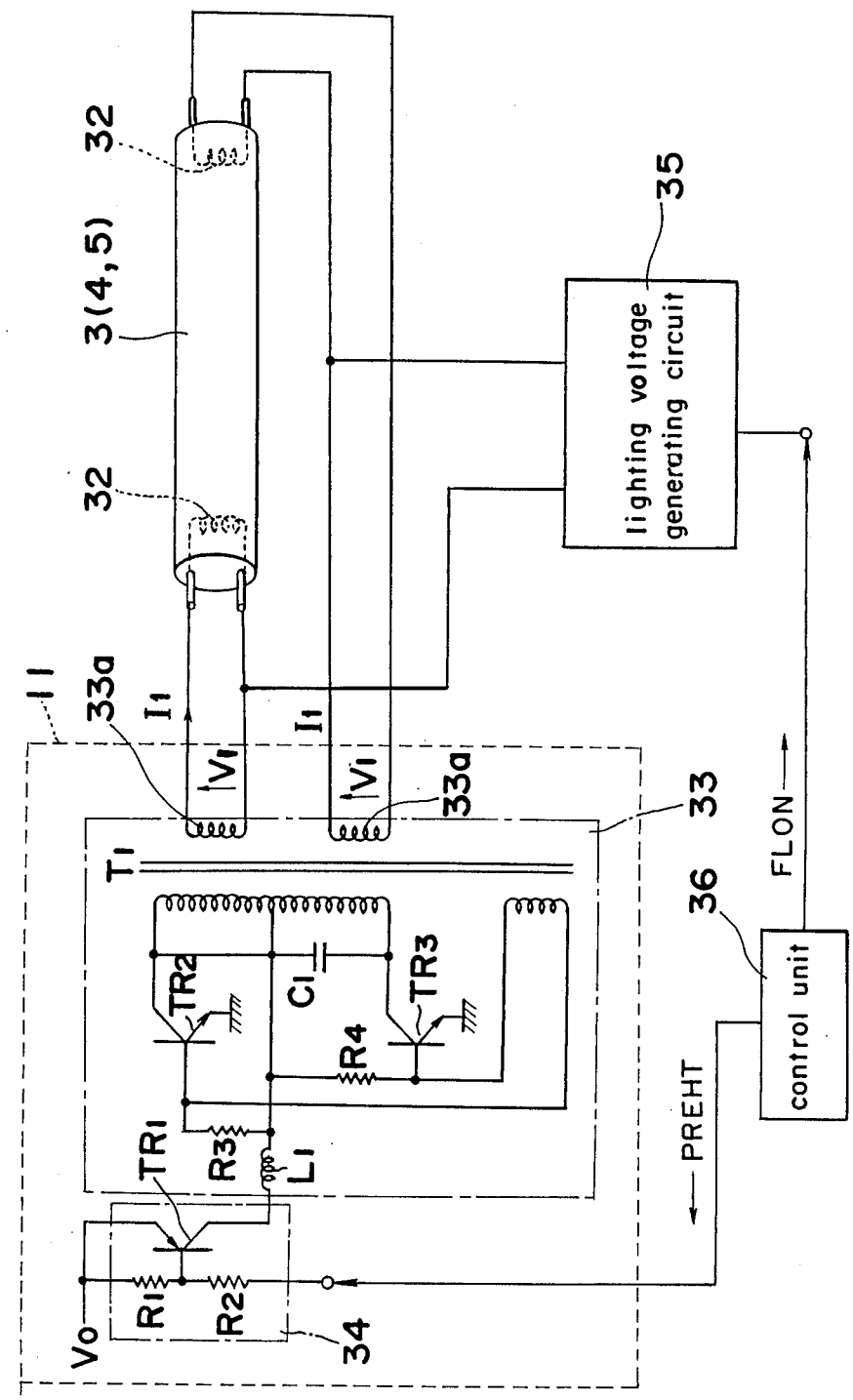
FIG. 2 is a schematic diagram of a fluorescent-lamp lighting circuit.

FIG. 2 is a schematic diagram of the lighting circuit of the fluorescent lamps. Referring to FIG. 2, reference character 3 (4,5) is a fluorescent lamp provided with electrode filaments 2, 2, reference character 33 is a known blocking oscillation circuit composed of a choke $L_1$, resistors $R_3$, $R_4$, transistors $TR_2$, $TR_3$, a capacitor $C_1$, a transformer $T_1$, etc., reference character 34 is an ON-OFF circuit composed of the resistors $R_1$, $R_2$, a transistor $TR_1$, reference 35 is a lighting voltage generating circuit, and reference character 36 is a control unit. The control unit 36 outputs a preheating signal PREHT and a lighting signal FLON in accordance with the lighting operation of a lighting switch (not shown), etc. The blocking oscillation circuit 33 oscillates when the preheating signal PREHT reaches an L level and the transistor $TR_1$ of the ON-OFF circuit 34 conducts. This oscillation generates a preheating voltage $V_1$ in the secondary coils 33a, 33a of the transformer $T_1$ so that filaments 32, 32 are preheated by the preheating current $I_1$. Also, the lighting voltage generating circuit 5 operates when the lighting signal FLON reaches an L level. A high voltage is applied between the filaments 32, 32 to light the fluorescent lamp 1.

Figure 3:
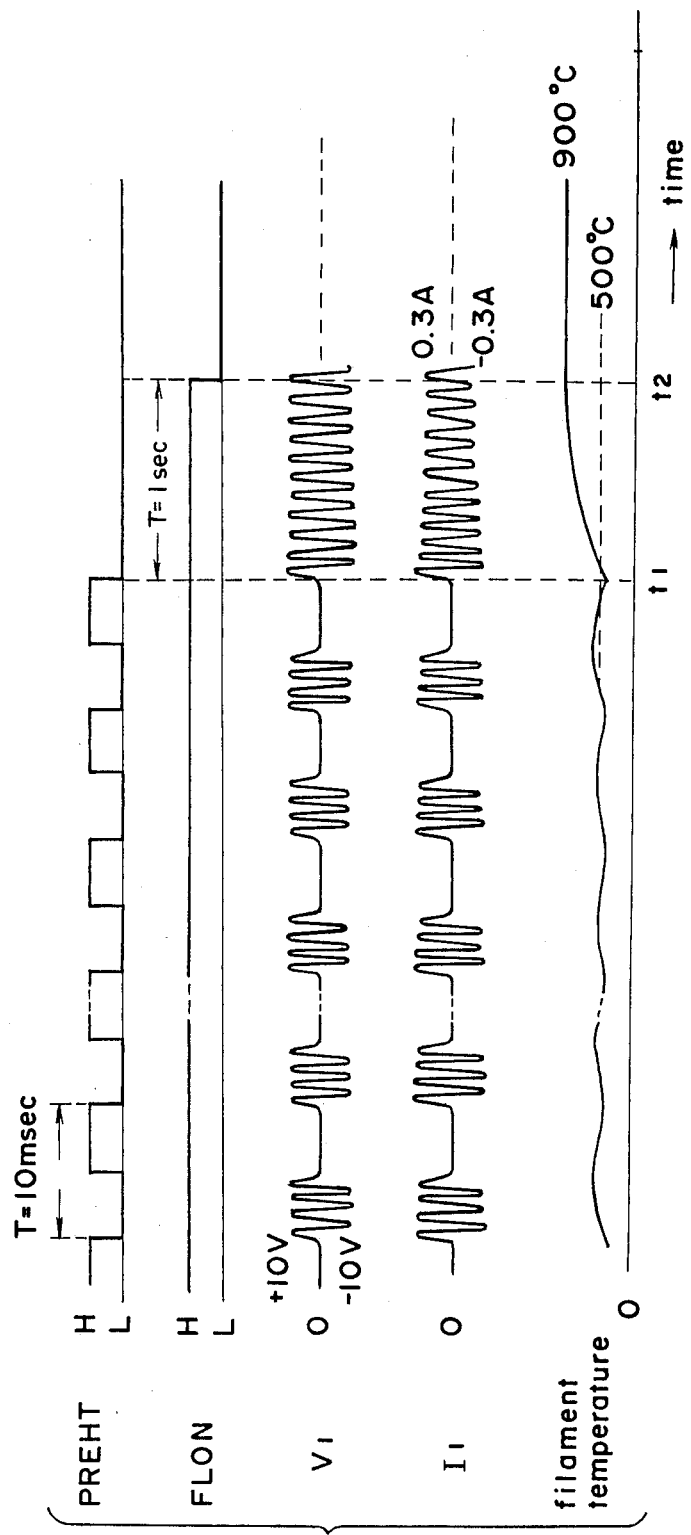
FIG. 3 is a timing cart showing the operation of FIG. 2.

FIG. 3 is a timing chart showing the preheating operation of the filament. The preheating signal PREHT becomes pulse waves where the H level and L level repeat at a given period T in a waiting condition where the fluorescent lamp 1 is off as shown in FIG. 3. Accordingly, the operation of the blocking oscillation circuit 3 becomes intermittent so that the preheating current $I_1$ intermittently flows to the filaments 32, 32 as shown to retain the filaments 32, 32 in a semi-preheated condition. The intermittent period T of the preheating current $I_1$ and the energization duty thereof are set to a value which is adapted to prevent surge currents from flowing which is caused each time the energization is performed again because of the filaments being cooled each time the energization stops, and to prevent wasteful power consumption and wear, and tear of the filament caused by the filaments heating more than necessary. Namely, the period T is sufficiently shorter than the temperature rise time-constant during the filament heating and the temperature fall time-constant during non-heating. Set, for example, T=10 m sec, set the energization duty, for example, to 50% and the filaments 32, 32 are maintained at approximately 500° C. in temperature. When the lighting operation is performed at a time $t_1$, the preheating signal PREHT remains L in level, allowing the preheating current $I_1$ to be continuously energized to raise the temperature of the filaments 32, 32 to approximately 900° C. necessary for lighting. As the filaments are half-heated to approximately 500° C. in advance, the temperature is raised to 900° C. in a time as short as approximately 1 second. Accordingly, the lighting signal FLON is rendered L in level at the time $t_2$ after one second after the lighting operation to operate the lighting voltage generating circuit 5 to generate the high voltage. The fluorescent lamp 1 is lit at a time delayed by about one second from the lighting operation. Accordingly, in the present embodiment, the preheating current is interrupted by ON-OFF of the blocking oscillation circuit so that the positive operation is simplified by the simple circuit construction.

Figure 7:
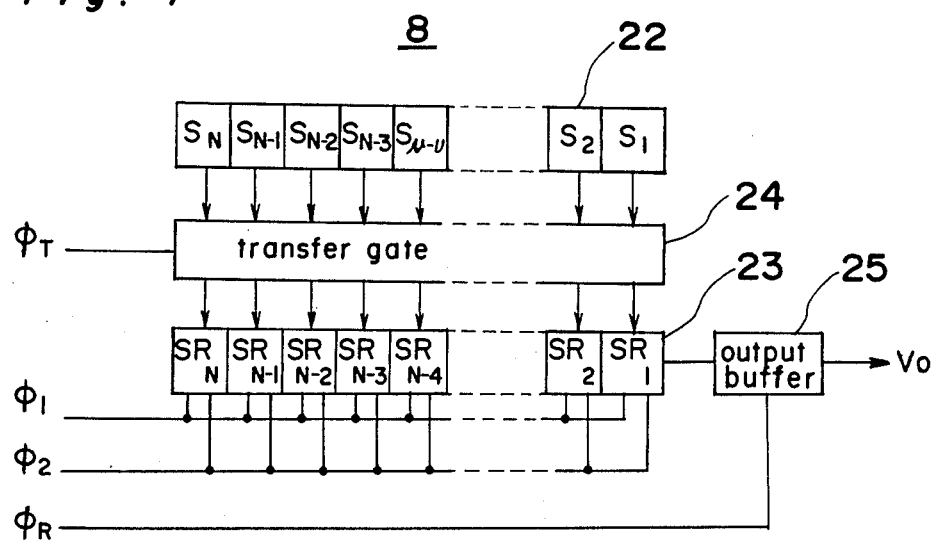
FIG. 7 is a block diagram showing the construction of the CCD sensor.
Figure 8:
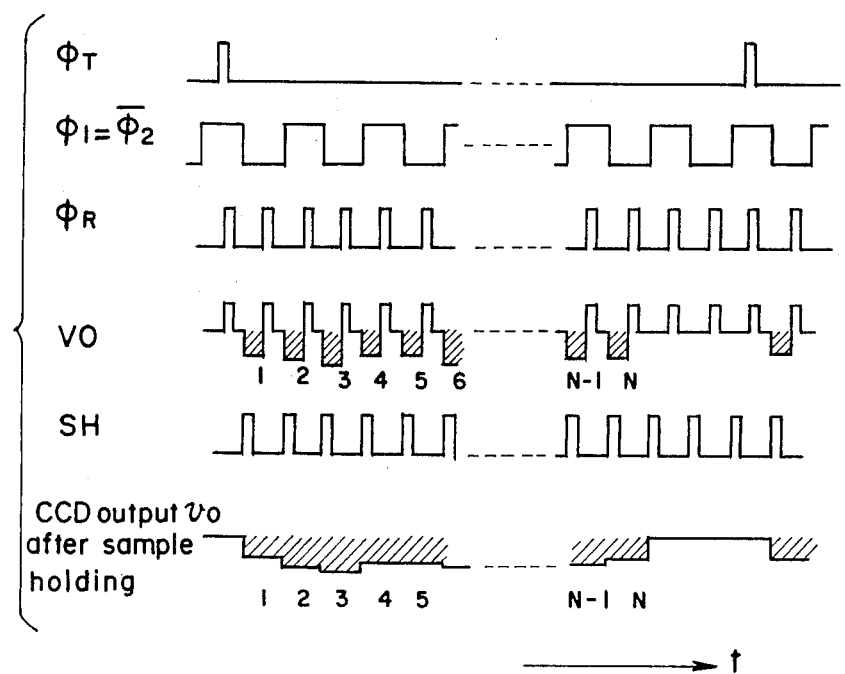
FIG. 8 is an operation timing chart of the CCD sensor.

Referring to FIG. 1, as shown in FIG. 7, the CCD sensor 8 has a sensor unit 22, composed of N number of light receiving elements $S_1$ through $S_N$, connected with an N bit analog shift-register 23 through a transfer gate 24. The CCD sensor 8 is driven by the pulse signals $\phi T$, $\phi 1$, $\phi 2$, $\phi R$ from the control circuit 10 and the output signal V0 of the output buffer 25 is inputted into a sample hold circuit 12. FIG. 8 shows the timing chart of the signals $\phi T$, $\phi 1$, $\phi 2$, $\phi R$, V0, a sample hold signal SH, a CCD output v0 after the sample holding. As the CCD sensor is known, the description is not given in detail.

An AD converter 13 converts in AD the sample-held CCD output v0 into 255 levels with, for example, 8 in bit length K, 255 ($=2^K-1$) in the reference voltage $V_{REF}$ given from the DA converter 14, 0 in voltage 0v. Also, in $|v0| \geq |V_{REF}|$, the output of the AD converter 13 is normally 255 ($=FF_H$). Also, $v0 \leq 0$. In the DA converter 14, when the control signal $T_{SHD}$ from the control circuit 10 is "1", the output $V_{REF}(n)$ is constant at $-2$ v. When the control signal $T_{SHD}$ is "0", $$V_{REF}(n) = -2v \times 1/255 \left( \sum_{k=0}^{7} D_k n \cdot 2^k \right)$$

wherein $D_k(n)$, ($k=0, \ldots, 7$) shows 8-bit binary data of the nth element of the CCD sensor to be fed from a shading memory 15.

The shading memory 15 stores binary data of $3 \times N \times K$ ($=8$) bits, wherein the sample-held CCD output v0 with respect to the reflection lights of the reference white-color unit 9 by the respective emitted lights of the red, green, blue fluorescent lamps 3, 4, 5 is AD converted. The shading memory is composed of R memory 16, G memory 17, B memory 18 respectively of $N \times K$ ($=8$) bits. A read, write signal R/W and memory select signals $S_1$, $S_2$ are fed from the control circuit 10 to the shading memory 15. The R memory 16 is selected when the memory select signals $S_1$, $S_2$ are both "0", the G memory 17 is selected when the signal $S_1$ is "1", the signal $S_2$ is "0", the B memory 18 is selected when the signal $S_1$ is "0", the signal $S_2$ is "1". The shading memory 15 is used to collectively compensate the dispersion in light quantity along the tube length direction of the red, green, blue fluorescent lamps 3, 4, 5, the dispersion in light quantity because of lens 7 or the dispersion in the sensitivity of the CCD sensor 8.

Figure 9:
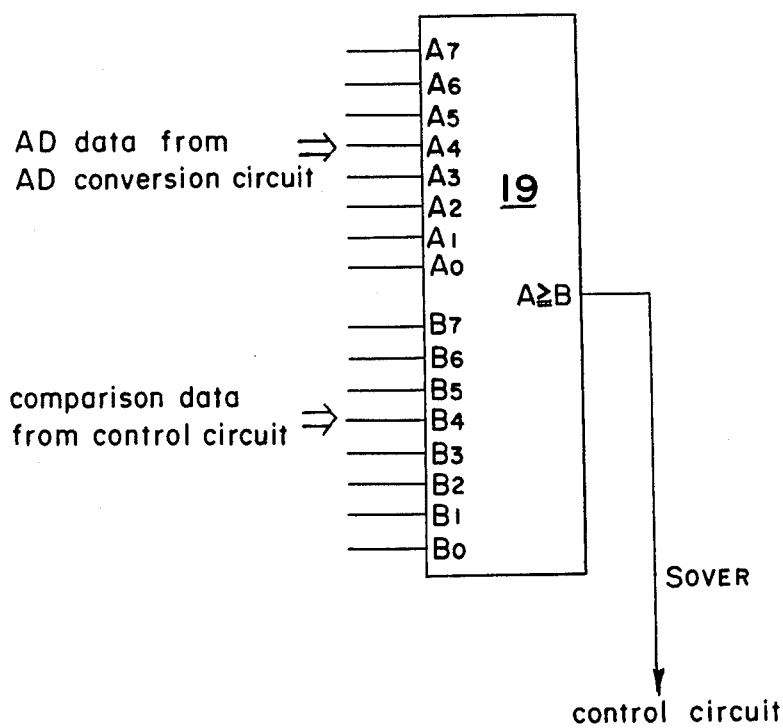
FIG. 9 is a partial detailed block diagram of FIG. 1.

As shown in FIG. 9, a peak value detection circuit 19 receives into an A input the 8-bit data of the AD converted CCD output v0 and receives into a B input the 8-bit comparison data from a control circuit 10. And the output signal $S_{OVER}$ is "1" in $$\sum_{k=0}^{7} A_k \cdot 2^k \geq \sum_{k=0}^{7} B_k \cdot 2^k,$$

i.e., A input≧B input, and is "0" in $$\sum_{k=0}^{7} A_k \cdot 2^k < \sum_{k=0}^{7} B_k \cdot 2^k,$$

i.e., A input<B input, wherein the respective binary data of the A input, B input are Ak, Bk.

A pulse motor drive circuit 20 drives a pulse motor 21 for paper feed use. And an advancing operation is performed when the signal F/B from the control circuit 10 is "1", a retreating operation is performed when the signal F/B is "0". Also, a pulse motor 21 is rotated by one step at one rise of a step feed signal PMSTP from the control circuit 10. The paper feeding operation, which has nothing to do with the present invention, will not be described.

Figure 10:
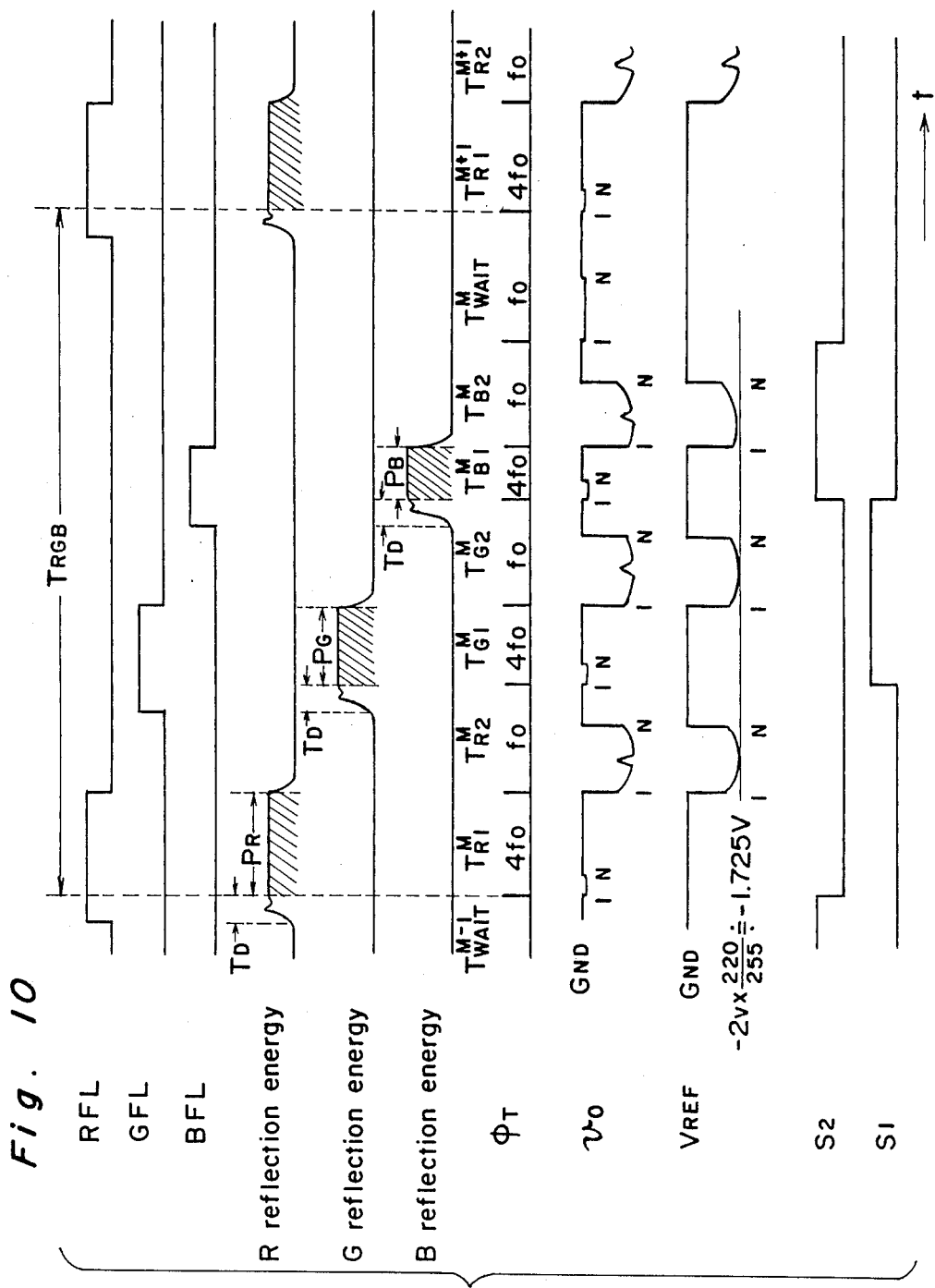
FIG. 10 is an operation timing chart of the color reading in the embodiment of the present invention.

FIG. 10 shows a timing chart, wherein each compensating data of the red, green, blue of the CCD output V0 with respect to the reflection lights from the reference white-color unit 9 are filled in the shading memory 15, thereafter the reading operation of the color manuscript 1 is performed as the read write signal R/W as "1". The reading period $T_{RGB}$ about the red, green, blue is composed of 7 periods $T_{R1}$, $T_{R2}$, $T_{G1}$, $T_{G2}$, $T_{B1}$, $T_{B2}$, $T_{WAIT}$. The $T_{R1}$, $T_{G1}$, $T_{B1}$ show a period for integrating light energies in the CCD sensor 8, the $T_{R2}$, $T_{G2}$, $T_{B2}$ show for AD converting the CCD output v0, the $T_{WAIT}$ shows waiting time for meeting the transfer time of the data with respect to an external appliance (for example, mini-computer or personal computer) connected with the color reader, and adjusting time provided to absorb the dispersion of the emitted strength of the red, green, blue fluorescent lamps 3, 4, 5.

It is to be noted that each lighting signal is output in advance by time $T_D$ from the start of the integration period of the CCD, because the lighting condition of the early time of the fluorescent lamp lighting is unstable. To remove the influences of the electric charge to be caused by the light leaked into the analog shift-register located within the CCD during the integration period, the analog shift-register of the CCD is driven by a frequency $4f_0$ higher than the normal clock frequency $f_0$. To prevent the mixing (mixed color) between the electric charge including the original color information and the electric charge through the emitted light of the different color fluorescent lamp, the emitted lights of the fluorescent lamp stop while the CCD output of the original color information is AD converted.

The unification of the CCD output v0 with respect to the reflection lights in the reference white-color unit 9 of the emitted lights of the red, green, blue, and the writing of the waveform data, i.e., the shading waveform data of the CCD output v0 after the compensating operation of the shading memory 15 will be described hereinafter. At first, the order is as follows:

(a) Decision of the period $T_{RGB}$,
(b) A pulse motor is driven to move the reference white-color unit 9 to a reading position,
(c) Decision of the light emitting period of the red fluorescent lamp,
(d) Writing of the red shading waveform data into the R memory 16,
(e) Decision of the emitted light period of the green fluorescent lamp,
(f) Writing of the green shading waveform data into the G memory 17,
(g) Decision of the emitted light period of the blue fluorescent lamp,
(h) Writing of the blue shading waveform data into the B memory 18,
(i) Sequential flashing start of the red, green, blue.

The above-described (c), (d) will be described in accordance with the timing chart of FIG. 11 and FIG. 1.

In this case, the control signal $T_{SHD}$ to be given to the DA converter 14 is "1", the reference signal $V_{REF}$ to be given to the AD converter 13 is fixed to $-2$ v. Also, the comparison data to be fed into the B input of the peak value detecting circuit 19 is 220 ($=DC_H$) corresponding to approximately $-1.725$. It is to be noted that to put the color-phase emphasis, the comparison data is not rendered 255 ($=FF_H$).

Then, to decide the integration period $P_R$ (FIG. 10) of the red reflection light energy, first the lighting signal RFL of the red fluorescent lamp 3 is outputted during a period of the total of the time $T_D$ and of the half of the greatest integration period $P_{MAX}$ determined in advance, so that the red fluorescent lamp 3 is lit during this period. As the CCD output of this time is less than 220 (about $-1.725$ v), the output signal $S_{OVER}$ of the peak value detection circuit 19 is "0". Accordingly, in the following scanning, the integration period becomes $P_{MAX}/2+P_{MAX}/4$, the peak value of CCD output v0 corresponding to it exceeds 220 (about $-1.725$ v), so that the signal $S_{OVER}$ becomes "1". As a result, in the following scanning, the integration period becomes $P_{MAX}/2+P_{MAX}/4-P_{MAX}/8$. At a stage where such a series of judging operations is repeated eight times, the peak value of the CCD output v0 is made closer to approximately 220 (about $-1.725$ v), the shading waveform data are written in the R memory 16 of the shading memory 15.

The integration period $P_R$ of the red reflection light energy is decided in the above-described manner, and the shading waveform data are written in the R memory 16 of the shading memory 15 with the peak value of the CCD output v0 being about $-1.725$ v. And in the similar method, the decision of the integration period $P_G$ of the green reflection light energy, the writing of the shading waveform data into the G memory 17, and the decision of the integration period $P_B$ of the blue reflection light energy, the writing of the shading waveform data into the B memory 18.

Figure 12:
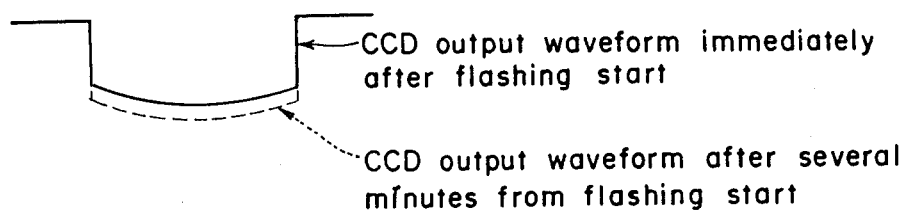
FIG. 12 is a waveform view of the CCD output in the embodiment of the present invention.

Although the red, green, blue fluorescent lamps 3, 4, 5 are sequentially flashed thereafter in a fixed light emission period, the color reading operation is not performed immediately. The reason is that the level and the waveform are somewhat different, because of changes in the temperature of the fluorescent lamps themselves through the flashing operation, between the output of the light emitted immediately after the flashing start of the fluorescent lamp and the output of the light emitted after several minutes from the flashing start, with the result that the level and waveform are different as shown in FIG. 12. In the present invention, the flashing operation continues (this period is assumed to be $T_{READY}$) sequentially in the above-described condition for several seconds through tens of seconds, thereafter the deciding operation of the red, green, blue light emission period and the refreshing of the shading memory 15 are performed again to perform the color reading operation. It is to be noted that this period $T_{READY}$ may be decided by the color reader itself from the size or the like of the color manuscript 1, or may be instructed by external appliances (mini-computer, personal computer or the like) to be connected. Also, when the color manuscript 1 is so small that the color reading is completed in a short time, the color reading operation may start immediately after the decision of one red, green, blue light-emission period. Once the color reading operation starts, the control signal $T_{SHD}$ becomes "0" and the read write signal R/W becomes "1".

Figure 13:
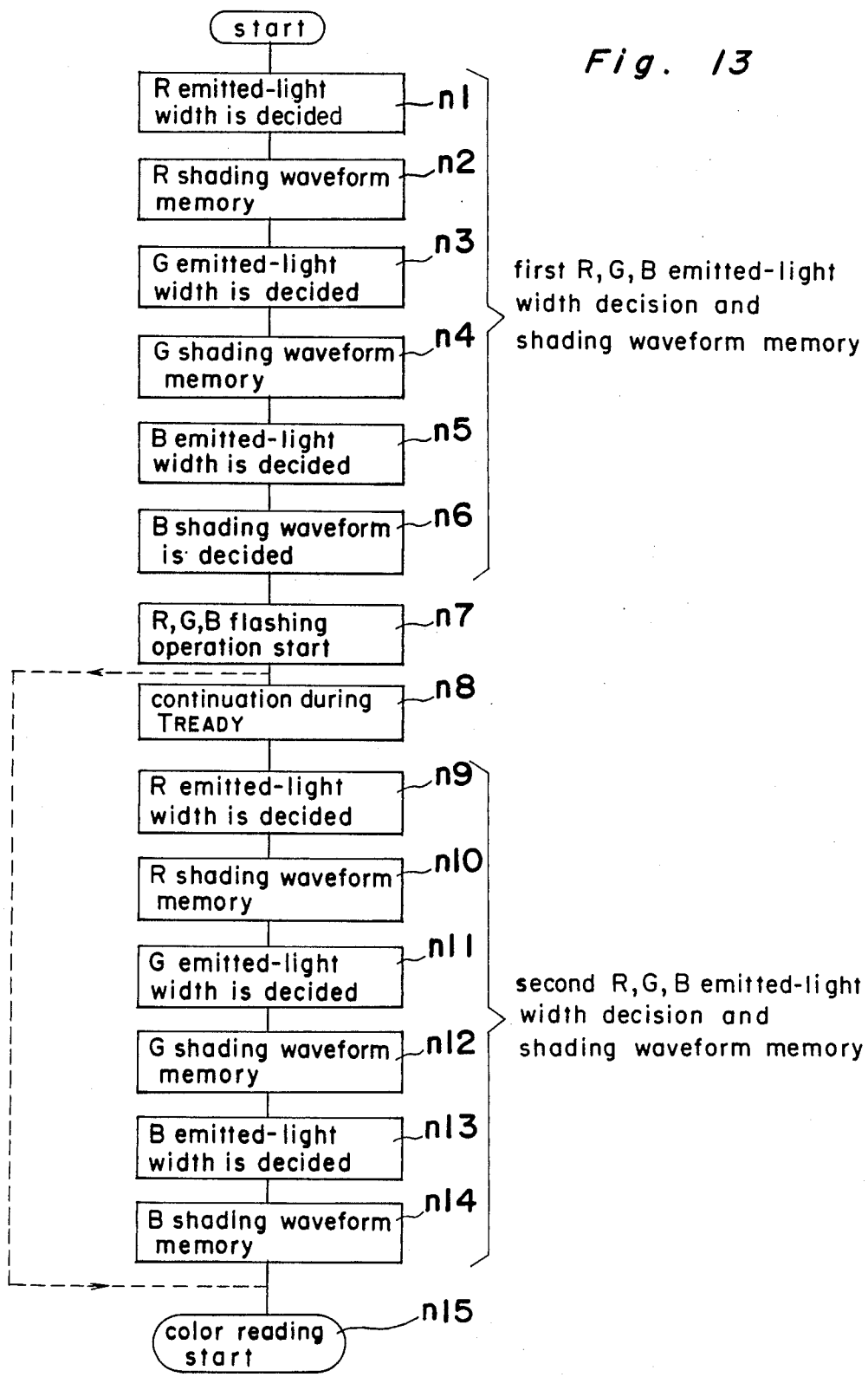
FIG. 13 and FIG. 16 are operation flow charts in the embodiment of the present invention.

The above described series of operation flow is shown in FIG. 13.

The above description shows a procedure in a case where so-called white balance is provided to perform the color reading, but the condition where the white balance is out of shape, i.e., a case where the color phase emphasis of the red, green, blue is performed to effect the color reading operation will be described hereinafter.

First, 220 ($=DC_H$) corresponding to approximately $-1.725$ v as the comparison data is fed to the peak value detecting circuit 19 with the control signal $T_{SHD}$ being "1" to decide the light emission period of the red, green, blue, the shading waveform data of the red, green, blue are written in the shading memory 15 with the peak value of each CCD output v0 being about $-1.725$ v.

Figure 11:
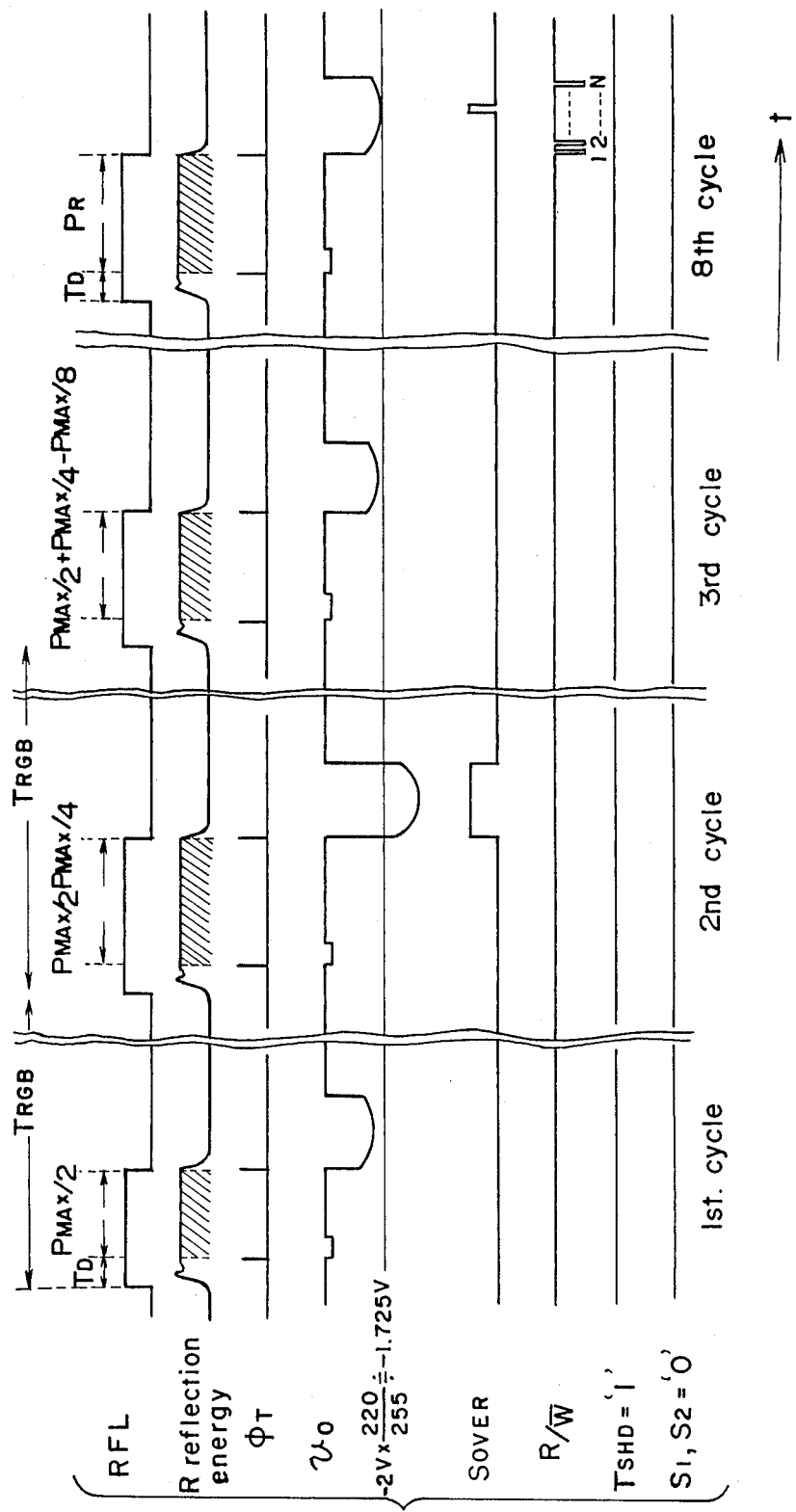
FIG. 11 is an operation timing chart in the embodiment of the present invention.
Figure 14:
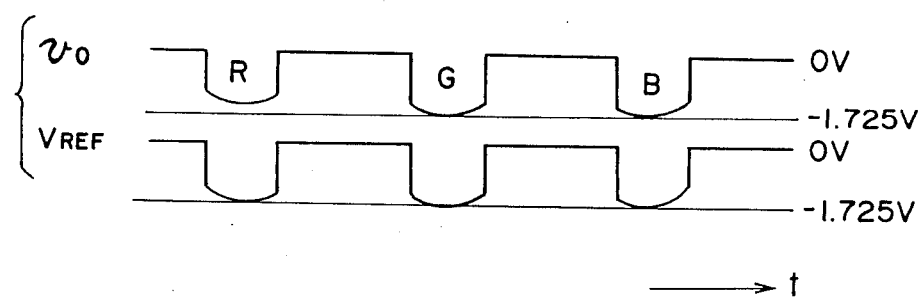
FIG. 14 and FIG. 15 are waveform charts showing the relation between the CCD output v0 and the reference voltage $V_{REF}$ in the embodiment of the present invention.
Figure 15:
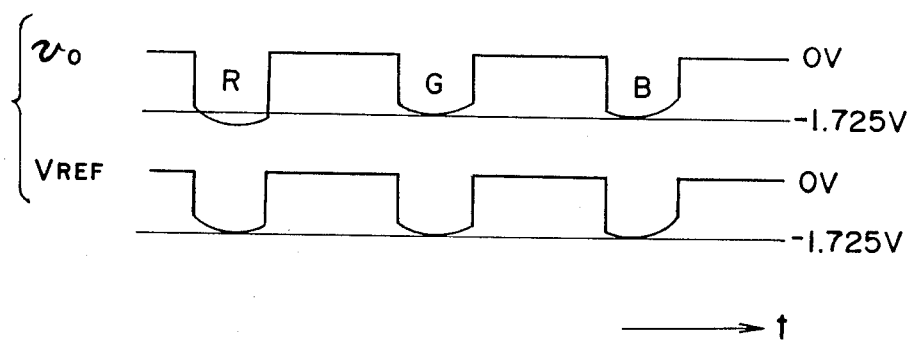
Figure 16:
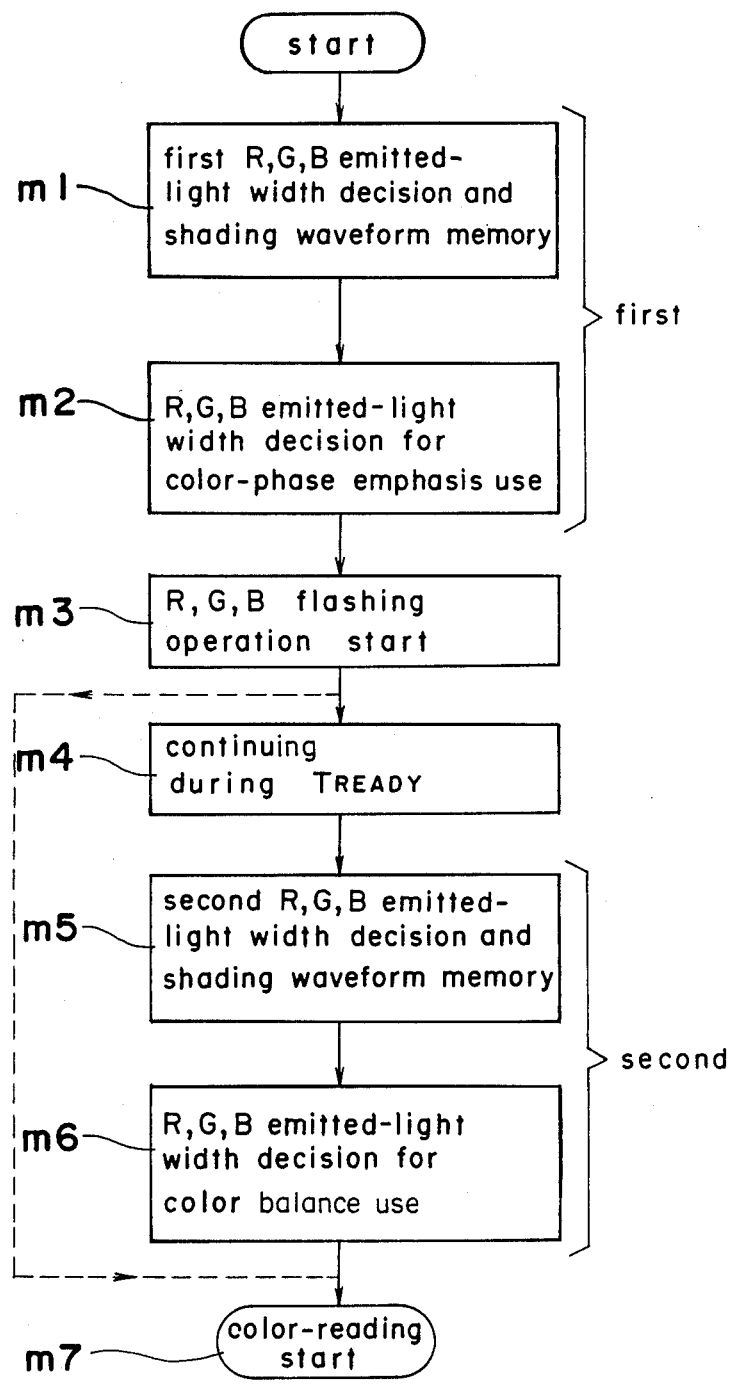

Then, to weaken the red, 200 ($=C8_H$) corresponding to, for example, about $-1.57$ v as the comparison data is fed to the peak value detection circuit 19 again to decide the red light emission period in accordance with the procedure in FIG. 11. However, at this time the rewriting is not performed into the R memory 16 of the shading memory 15. When the color reading is performed in accordance with the light emission period of the red, green, blue decided in this manner, the red-weakened, namely, the green-, blue-emphasized color reading may be performed. The relationship between the CCD output v0 in the color reading in this case and the reference voltage $V_{REF}$ to be fed to the AD converter 13 is shown in FIG. 14. Also, when the red is emphasized, 255 ($=FF_H$) corresponding to, for example, about $-2$ v as the comparison data of the peak value detection circuit 19 is fed to decide the red light-emission period, as described hereinabove, to perform the color reading operation. The relation between the CCD output v0 in this case and the reference voltage $V_{REF}$ is shown in FIG. 15. FIG. 16 shows the operation flow in the case of the color-phase emphasis.

As is clear from the foregoing description, according to the arrangement of the present invention, in a color reader by the sequential flashing of the red, green, blue fluorescent lamps and a single CCD sensor, differences in the emitted light strength of the respective fluorescent lamps, in the application angle of the lights into the reading line or sensitivity differences in the respective wavelength zones of the red, green, blue of the CCD sensor are compensated by changes in both the emitted light period of each fluorescent lamp and the integration period of the light energy of the CCD sensor with respect to each emitted light, so that the output levels of the CCD sensor corresponding to the emitted light energies of each fluorescent lamp are made the same. The AD conversion accuracy of the CCD output data with respect to the red, green, blue emitted lights may be made almost the same, thus increasing the accuracy of the color reading.

Also, considering changes in the light emission time of the fluorescent lamp, decision of two light emission periods and writing of the shading waveform data into the shading memory are performed before the action moves to the color reading operation, furthermore, the preparing period $T_{READY}$ of the sequential flashing operation of the red, green, blue is provided between the first and the second for stabilization of the emitted lights of the fluorescent lamp thereby realizing the stable color reading.

Furthermore, according to the present invention, the light emission period in the actual color reading is changed with respect to the light emission period of the fluorescent lamp at a time when the writing has been performed into the shading memory, thus allowing the color reading to be easily performed by the color-phase emphasis of the red, green, blue.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a color reader for reading a color document including a plurality of light sources for emitting light of respective different colors onto said document for respective light emission periods and a sensor for receiving light reflected from said document and for integrating the received light for an integration period, the improvement comprising:
    means for successively directing light of the respective different colors from said plurality of light sources onto a white reference area so as to successively reflect light of each of the respective different colors from said white reference area;
    means for directing the light so reflected from said white reference area onto said sensor;
    means for determining a light emission period for each of said plurality of light sources and a corresponding integration period for said sensor such that the peak value of a signal produced by said sensor is substantially equal to a predetermined reference value when light of corresponding ones of the respective different colors is reflected from said white reference area and directed onto said sensor;
    memory means for storing the light emission periods and the integration periods determined by said determining means; and
    means for controlling said plurality of light sources and said sensor in accordance with the light emission periods and the integration periods stored by said memory means while said color reader reads said color document.

2. The color reader of claim 1, wherein each of the light emission periods is longer than the corresponding integration period.

* * * * *